(12) United States Patent
Moran

(10) Patent No.: US 11,072,426 B2
(45) Date of Patent: Jul. 27, 2021

(54) GALLEY SYSTEM OF AN AIRCRAFT

(71) Applicant: THE BOEING COMPANY, Chicago, IL (US)

(72) Inventor: Thomas Joseph Moran, Lake Stevens, WA (US)

(73) Assignee: The Boeing Company, Chicago, IL (US)

(*) Notice: Subject to any disclaimer, the term of this patent is extended or adjusted under 35 U.S.C. 154(b) by 791 days.

(21) Appl. No.: 14/949,483

(22) Filed: Nov. 23, 2015

(65) Prior Publication Data

US 2017/0144763 A1    May 25, 2017

(51) Int. Cl.
*B64D 11/04* (2006.01)
*B64D 11/00* (2006.01)
*B64D 13/06* (2006.01)

(52) U.S. Cl.
CPC .......... *B64D 11/04* (2013.01); *B64D 11/0007* (2013.01); *B64D 2013/0629* (2013.01)

(58) Field of Classification Search
CPC .... B64D 2013/0629; B64D 2013/0603; B64D 13/006; Y10S 165/919; F24F 13/0272
See application file for complete search history.

(56) References Cited

U.S. PATENT DOCUMENTS

| | | | |
|---|---|---|---|
| 3,976,122 A * | 8/1976 | Neidhardt | A23L 3/363 165/265 |
| 4,361,014 A | 11/1982 | Blain | |
| 6,845,627 B1 | 1/2005 | Buck | |
| 6,975,958 B2 | 12/2005 | Bohrer et al. | |
| 7,024,875 B2 | 4/2006 | Zywiak et al. | |
| 7,231,778 B2 | 6/2007 | Oswald | |
| 7,721,564 B2 | 5/2010 | Rizzo | |
| 8,151,582 B2 | 4/2012 | Oswald | |

(Continued)

FOREIGN PATENT DOCUMENTS

| | | |
|---|---|---|
| DE | 19952523 | 5/2001 |
| DE | 102015100976 A1 | 9/2015 |

(Continued)

OTHER PUBLICATIONS

James P. Schalla; Galley Refrigeration System of an Aircraft; U.S. Appl. No. 14/716,409; filed May 19, 2015; 22 Pages.

(Continued)

*Primary Examiner* — Jianying C Atkisson
*Assistant Examiner* — Meraj A Shaikh
(74) *Attorney, Agent, or Firm* — The Small Patent Law Group LLC; Jay J. Hoette

(57) ABSTRACT

A galley includes a cart compartment configured to receive at least one galley cart. The cart compartment is defined by a plurality of walls including a rear wall behind the cart compartment, side walls along sides of the cart compartment, a mid-wall above the cart compartment and a bottom wall below the cart compartment. Doors are coupled to the cart compartment to enclose and allow access to the cart compartment. A supply duct supplies cooled airflow to the cart compartment. The supply duct is positioned in the cart compartment forward of the rear wall and positioned in the cart compartment between the mid-wall and the bottom wall. The supply duct includes a supply device to allow airflow from an interior of the supply duct into the cart compartment.

21 Claims, 3 Drawing Sheets

(56) References Cited

U.S. PATENT DOCUMENTS

| | | | |
|---|---|---|---|
| 8,474,274 B2 | 7/2013 | Schalla et al. | |
| 2003/0042361 A1 | 3/2003 | Simadiris | |
| 2008/0155993 A1 | 7/2008 | Kuehl | |
| 2010/0050665 A1 | 3/2010 | Oswald | |
| 2012/0130679 A1 | 5/2012 | Fadell et al. | |
| 2013/0047657 A1* | 2/2013 | Oswald | B64D 11/04 62/407 |
| 2013/0099011 A1 | 4/2013 | Matsuoka et al. | |
| 2015/0007600 A1 | 1/2015 | Godecker et al. | |
| 2015/0059363 A1* | 3/2015 | Burd | B62B 5/0447 62/3.62 |
| 2015/0059384 A1* | 3/2015 | Burd | B60H 1/00014 62/239 |
| 2015/0059385 A1* | 3/2015 | Burd | B60H 1/00014 62/239 |
| 2015/0065024 A1 | 3/2015 | Moran et al. | |
| 2016/0084592 A1* | 3/2016 | Mackin | B64D 11/04 165/287 |

FOREIGN PATENT DOCUMENTS

| | | |
|---|---|---|
| EP | 2251260 | 11/2010 |
| EP | 2845802 | 3/2015 |
| EP | 3095698 A1 | 11/2016 |
| GB | 2095387 | 9/1982 |
| RU | 2412868 C2 | 2/2011 |
| WO | 2012112356 | 8/2012 |

OTHER PUBLICATIONS

Garcia et al.; Systems and Methods of Cooling a Galley of an Aircraft; U.S. Appl. No. 14/716,196; filed May 19, 2015; 22 Pages.

Thomas Joseph Moran; Galley Compartment for a Galley System of an Aircraft; U.S. Appl. No. 14/525,723; filed Oct. 28, 2014; 33 Pages.

Thomas Joseph Moran; Galley Cart and Galley System of an Aircraft; U.S. Appl. No. 14/716,357; filed May 19, 2015; 28 Pages.

Search Report for EP 14183463, dated Jan. 30, 2015; 8 pages.

Extended European Search Report for corresponding EP Application No. 16199785.3-1757 dated Mar. 28, 2017 (9 pages).

Office Action for corresponding CA Application No. 2,941,819 dated Mar. 9, 2020 (3 pages).

Office Action for corresponding RU Application No. 2016136402/11(057163) dated Feb. 25, 2020).

Chinese Office Action for corresponding CN application No. 201611002878.4 dated Jan. 13, 2021 (8 pages).

* cited by examiner

GALLEY SYSTEM OF AN AIRCRAFT

BACKGROUND

The present disclosure relates generally to systems and methods of cooling a galley of an aircraft.

Aircraft typically include multiple galleys to store food and beverages on the aircraft. The food and beverages are typically stored in galley carts which are transported to the aircraft and stored in refrigerated compartments or zones in the galleys. A heat exchanger is typically provided at the top of the galley and supplies cooled air to each of the compartments or zones via a plurality of air ducts and other components. In conventional systems, the air ducts and the supply and return devices associated with the air ducts are routed through the rear wall of the galley to the cart compartment to supply the cooled air to the cart compartment and to return the air to the heat exchanger. For example, vertical ducts may extend from the heat exchanger, located above the galley, down the rear wall of the galley to the level of cart compartment, which is located at the bottom of the galley. Horizontal ducts may extend from the corresponding vertical ducts along the various galley carts to supply the air to, or return the air from, the galley carts and the cart compartment.

A large amount of space is required for the airflow supply and return components, such as the ducts and the valves that interface with the galley carts. The footprint of the galley is deep enough to accommodate the galley carts as well as the airflow supply and return components. The galleys occupy valuable space within the cabin of the aircraft, which limits the number of passenger seats that may be provided on the aircraft. For example, the airflow supply and return components may add approximately 4-5 inches (in) (10-13 centimeters (cm)) of depth to the galleys, and some aircraft may have eight or more galleys, leading to a large amount of cabin space dedicated to the airflow supply and return components, which may be used for other purposes.

SUMMARY

In accordance with one embodiment, a galley is provided including a cart compartment configured to receive at least one galley cart. The cart compartment is defined by a plurality of walls including a rear wall behind the cart compartment, side walls along sides of the cart compartment, a mid-wall above the cart compartment and a bottom wall below the cart compartment. Doors are coupled to the cart compartment to enclose and allow access to the cart compartment. A supply duct supplies cooled airflow to the cart compartment. The supply duct is positioned in the cart compartment forward of the rear wall and positioned in the cart compartment between the mid-wall and the bottom wall. The supply duct includes a supply device to allow airflow from an interior of the supply duct into the cart compartment.

In accordance with another embodiment, a galley is provided including a cart compartment including a cavity configured to receive at least one galley cart. The cart compartment is defined by a plurality of walls including a rear wall behind the cart compartment and opposite a front of the cart compartment. Doors are coupled to the front of the cart compartment to enclose and allow access to the cart compartment. A supply duct supplies cooled airflow to the cart compartment. The supply duct has a rear facing the rear wall, a front in the cavity facing the doors and a side in the cavity extending between the front and the rear and configured to face the at least one galley cart. The supply duct includes a supply device at the side allowing airflow from an interior of the supply duct into the cart compartment through the side.

In accordance with a further embodiment, a galley system is provided including a heat exchanger supplying cooled airflow, an airflow supply and return system having a supply duct and a return duct in flow communication with the heat exchanger, and a galley receiving the supply duct and the return duct and being in flow communication with the heat exchanger. The galley includes a cart compartment including a cavity configured to receive a first galley cart and a second galley cart. The cavity receives the supply duct to supply cooled airflow to the cart compartment. The supply duct includes a supply device to allow airflow from an interior of the supply duct to the cart compartment. The first galley cart has a reduced depth compared to the second galley cart. The cart compartment is defined by a plurality of walls including a rear wall behind the cavity. The cavity being divided into a first cart space configured to receive the first galley cart and a second cart space configured to receive the second galley cart. The first cart space having a first depth and the second cart space has a second depth. The supply duct is positioned in the cart compartment between the rear wall and the first cart space such that the first depth is less than the second depth.

The features and functions that have been discussed can be achieved independently in various embodiments or may be combined in yet other embodiments, further details of which can be seen with reference to the following description and drawings.

DETAILED DESCRIPTION

Figure 1:
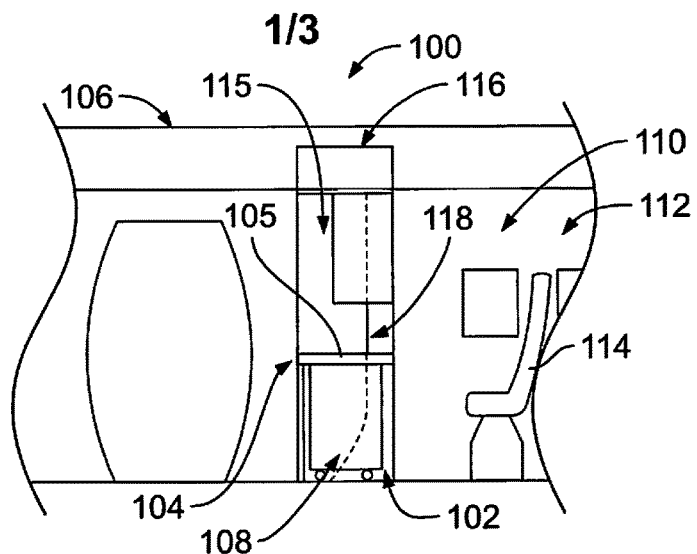
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a cart compartment of a galley monument, or simply galley, for cooling galley carts. Various embodiments provide cooling ducts of the galley system that are arranged to reduce a size or footprint of the galley monument, which may provide additional space in the passenger compartment, such as for adding additional room for passenger seating and/or additional leg room. Various embodiments provide an efficient cooling environment for the galley carts using an arrangement of supply and return ducts in the cart compartment to allow efficient air-over-cart cooling of the galley carts.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a mid-wall 105 of the galley 104, which may define a counter and be referred to hereinafter as counter 105. The mid-wall 105 defines a top of the cart compartment 102.

The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are typically located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

As used herein a cart compartment is an insulated or uninsulated volume that is utilized to store one or more galley carts on the aircraft 106. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108, including a single galley cart. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

The galley system 100 includes a heat exchanger 116 that provides cooled air. The heat exchanger 116 may be positioned above the galley 104 (e.g., in the crown of the aircraft 106), as in the illustrated embodiment, may be positioned in the galley 104, or may be positioned below the galley 104 (e.g., in the belly of the aircraft 106). The galley system 100 includes an airflow supply and return system 118, in flow communication with the heat exchanger 116 and the cart compartments 102, to channel the chilled air supply from the heat exchanger 116 to the cart compartments 102 and back to the heat exchanger 116.

Figure 2:
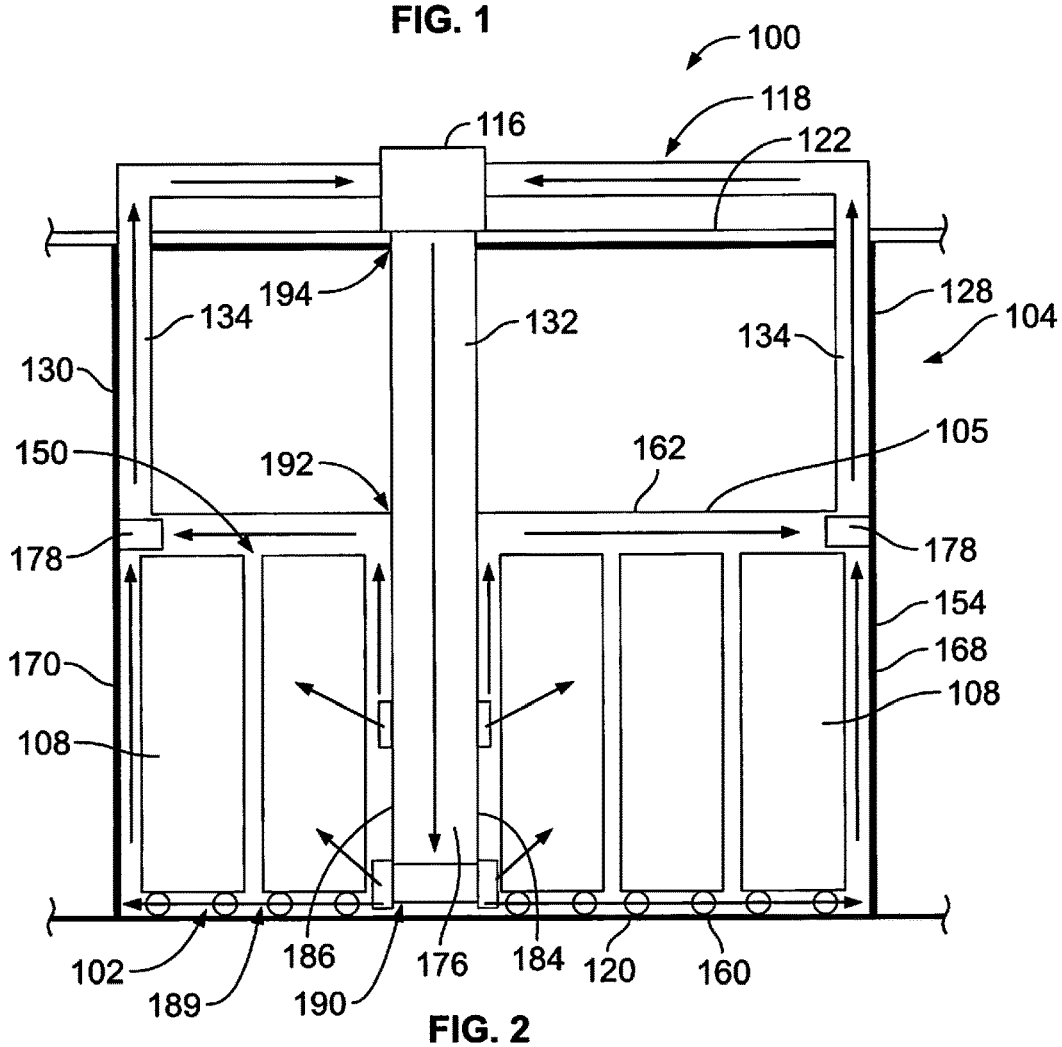
FIG. 2 is a front cross-sectional view across a width of a galley of the galley system in accordance with an exemplary embodiment.
Figure 3:
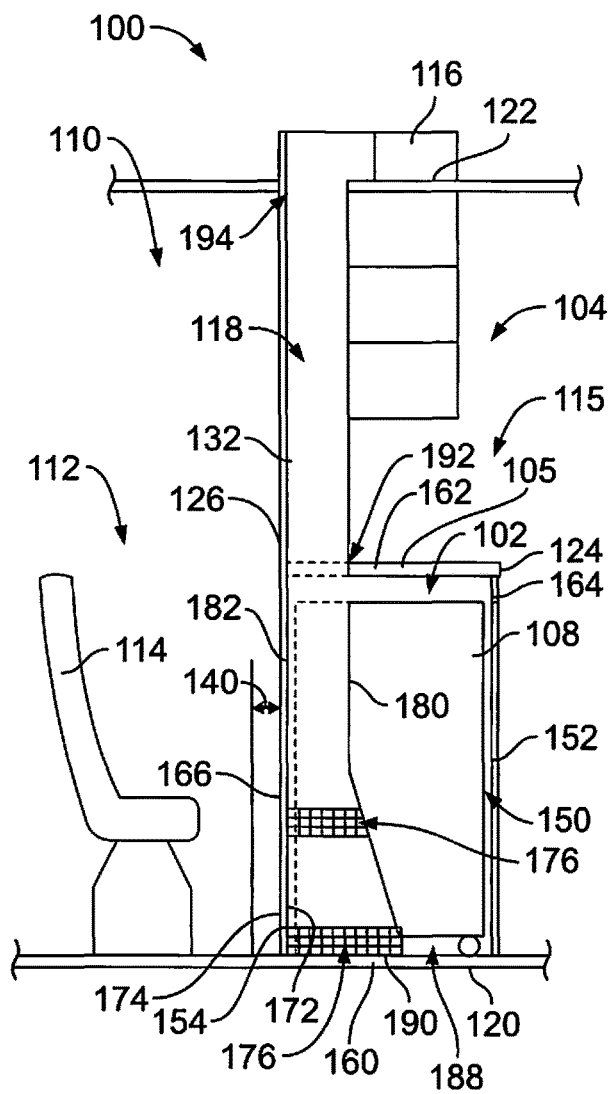
FIG. 3 is a side cross-sectional view through a depth of the galley in accordance with an exemplary embodiment showing an air supply.
Figure 4:
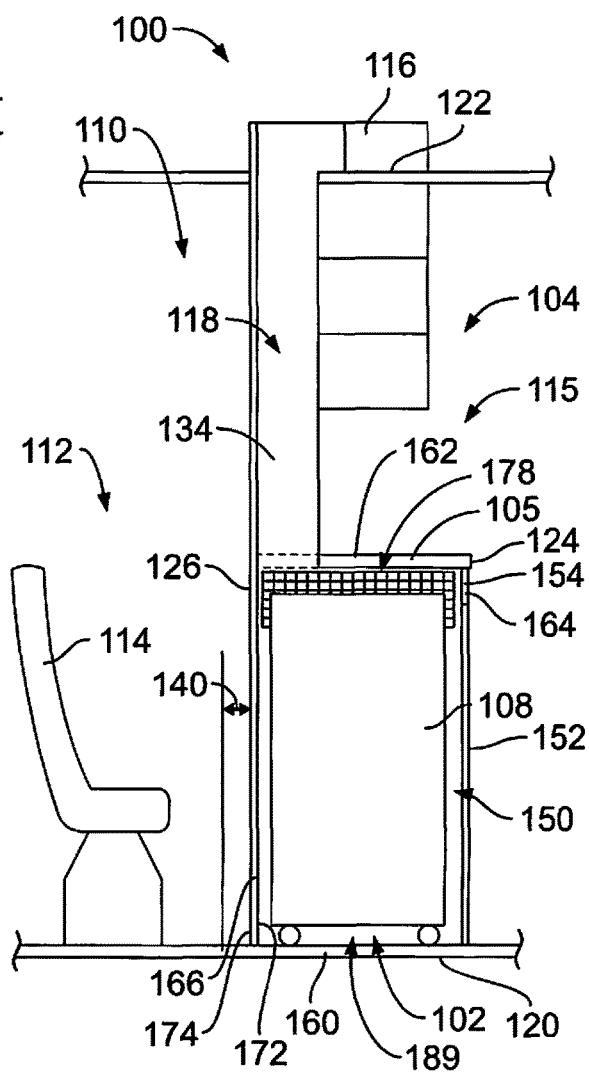
FIG. 4 is a side cross-sectional view through a depth of the galley in accordance with an exemplary embodiment showing an air return.
Figure 5:
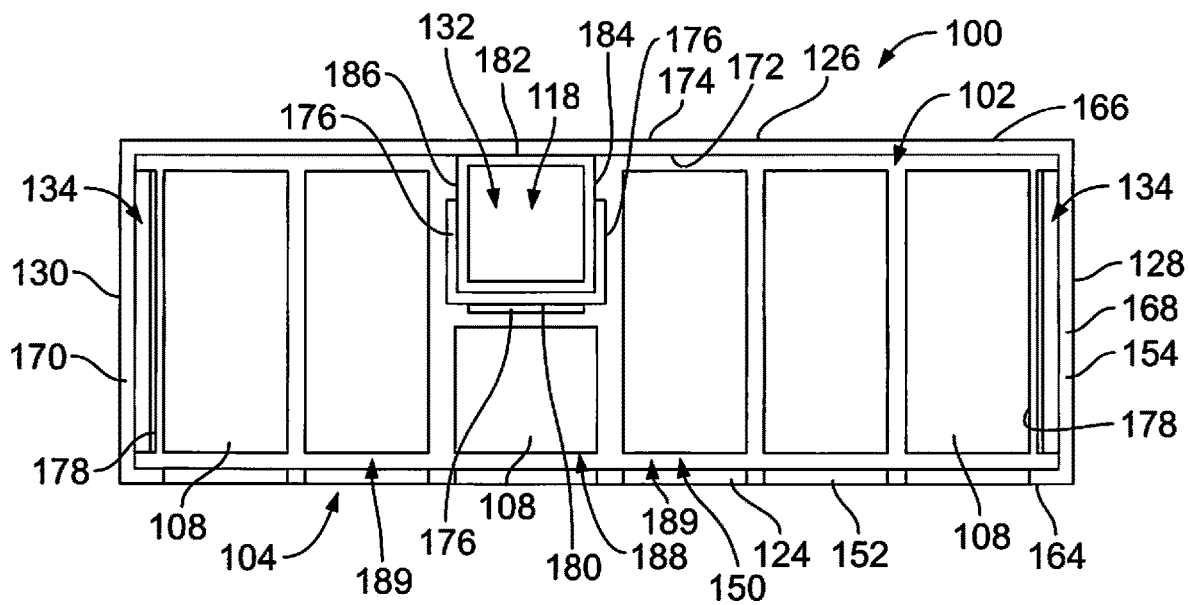
FIG. 5 is a top cross-sectional view across the width of the galley in accordance with an exemplary embodiment.

FIG. 2 is a front cross-sectional view across the width of the galley 104 and galley system 100 in accordance with an exemplary embodiment. FIG. 3 is a side cross-sectional view through the depth of the galley 104 and galley system 100 in accordance with an exemplary embodiment showing the air supply. FIG. 4 is a side cross-sectional view through the depth of the galley 104 and galley system 100 in accordance with an exemplary embodiment showing the air return. FIG. 5 is a top cross-sectional view across the width of the galley 104 and galley system 100 in accordance with an exemplary embodiment. Components are identified in at least one of the various FIGS. 2-5, but not necessarily in all of the Figures in which such components are shown. The components are not drawn to scale.

The galley 104 includes a bottom 120, a top 122, a front 124, a rear 126 opposite the front 124, and first and second sides 128, 130. The mid-wall 105 extends at least partially between the sides 128, 130 and at least partially between the front 124 and the rear 126. The mid-wall 105 may be approximately centered between the bottom 120 and the top 122; however, the mid-wall 105 may be positioned closer to the bottom 120 or closer to the top 122 in various embodiments. In the illustrated embodiment, the cart compartment 102 is positioned between the mid-wall 105 and the bottom 120. The rear 126 may be fore facing, aft facing or side facing, depending on the orientation of the galley 104 within the cabin 110. The rear 126 may face the passenger area 112 (e.g., passenger seats 114 may be located behind the rear 126, in front of the rear 126, and the like); however, in alternative embodiments, the rear 126 may be positioned against a bulkhead.

In an exemplary embodiment, the heat exchanger 116 is positioned at the top 122 of the galley 104. The heat exchanger 116 includes a fan or other air handling device to increase the flow of air through the galley system 100. The fan forces the airflow through the airflow supply and return system 118 and directs the air over a galley chilling unit used to reduce the temperature of the airflow. The fan may be positioned in the airflow supply and return system 118, such as between a return duct and a supply duct. The fan may be positioned upstream of the galley chilling unit; however, the fan may be positioned at other locations in alternative embodiments. In one embodiment, the galley chilling unit is a liquid-cooled galley chilling unit that provides chilled liquid, such as a refrigerant, to the heat exchanger 116 to cool the air supply. Heat exchanging of the liquid may be performed remote from the heat exchanger 116 and from the galley 104, such as in the belly of the aircraft 106. In another embodiment, the galley chilling unit is a conventional refrigeration unit, which includes an evaporator, a condenser, a compressor, and an expansion valve (not shown).

The airflow supply and return system 118 is arranged within the galley 104. Components of the airflow supply and return system 118 may be routed in various locations of the galley 104 and/or aircraft to supply and return the air as needed. In the illustrated embodiment, components of the airflow supply and return system 118 are generally arranged along the rear 126 of the galley 104, such as along the rear wall of the galley 104 (e.g., at the rear of the cabinets, at the rear of the cart compartment(s) 102, at the rear of other compartments of the galley 104, and the like). In an exemplary embodiment, the components of the airflow supply and return system 118 are routed in areas to reduce a depth of at least a portion of the galley 104. For example, one or more ducts of the airflow supply and return system 118 are routed to locations other than within the rear wall of the galley 104 to reduce the depth of the cart compartment 102, which may decrease the footprint of the galley area 115, and thus increase the footprint of the passenger area 112.

The airflow supply and return system 118 includes a plurality of ducts to supply and return air to the cart compartment 102 and the galley cart 108. For example, the system 118 includes at least one cooling air supply duct 132 to supply cooled air to the cart compartment(s) 102 and at least one air return duct 134 to return air to the heat exchanger 116. The ducts 132, 134, rather than being embedded in the walls or structures defining the cart compartment 102 of the galley 104, are positioned forward of the rear wall defining the cart compartment 102 and are routed directly into the cavity of the cart compartment 102 as opposed to being positioned behind the cavity of the cart compartment 102. The ducts 132, 134 are routed into the cart space for the galley carts 108 and thus occupy space otherwise, conventionally, used for the galley carts 108. By occupying cart space, the number of carts or the size of one or more of the galley carts 108 may need to be reduced; however, the reduction in the overall depth of the galley 104, such as by eliminating thickness in the rear wall previously and conventionally used for routing of supply and return ducts in the rear wall, allows more space to be dedicated to the passenger area 112 and increases the number of passenger seats 114. Reduction in volume of the cart compartment 102 equates to an increase in volume of the passenger area 112 and more space for passenger seats 114 and/or more leg room for passengers in the passenger seats 114 (an amount of gained space 140 is illustrated in FIGS. 3 and 4). Optionally, the galley width may be increased, without an increase in depth, to overcome the reduction in cart space such that the galley 104 includes all full size carts rather than a half cart.

The cart compartment 102 is positioned near the bottom 120, such as below the mid-wall 105, for loading and unloading of the galley carts 108 into a cavity 150 defined by the cart compartment 102. Cabinets or other non-cooled compartments may be provided above the cart compartment 102, such as above the counter area of the galley 104. In some alternative embodiments, cooled compartments may be provided above the counter area and the airflow supply and return arrangements described herein may be useful for such cooled compartments.

Optionally, the cart compartment 102 may have one or more doors 152 at the front 124 that may be opened to provide access to the cavity 150 of the cart compartment 102, such as to load and unload the galley carts 108 through the front 124. The door(s) 152 may be closed to retain the galley carts 108 in the cart compartment 102 and/or to enclose the cooling space in the cavity 150 and/or to provide thermal insulation. In an exemplary embodiment, when the galley cart 108 is positioned in the cavity 150, a space is defined about the galley cart 108. Optionally, air may be able to flow around the galley cart 108 in the space. In alternative embodiments, an air-through-cart supply arrangement may be utilized and, in such embodiment, the doors 152 may be unnecessary. The air may flow side-to-side through the carts or the carts may be turned 90° to allow air-through-cart supply.

The cart compartment 102 includes a plurality of walls 154 defining the cavity 150. The cart compartment 102 is part of the galley 104 and at least some of the walls 154 of the cart compartment 102 may be part of walls of the galley 104 or other structures of the aircraft 106. In an exemplary embodiment, the cart compartment 102 includes a bottom wall 160, a top wall 162, a front wall 164, a rear wall 166 and side walls 168, 170. Optionally, the galley 104 may include multiple cart compartments 102 (e.g., a left side and a right side cart compartment) and the side walls 168, 170 may separate adjacent cart compartments 102. In alternative embodiments, the galley 104 may include a single cart compartment 102 and the side walls 168, 170 define or extend along the exterior sides 128, 130 of the galley 104. The front wall 164 includes one or more doorways defined therethrough and closed by the doors 152. The doorways allow the galley cart 108 to be loaded into, and unloaded from, the cart compartment 102. The doors 152 are coupled to the front wall 164 to close the doorway. The top wall 162 may be defined by the mid-wall 105 of the galley 104, or alternatively, the mid-wall 105 may be positioned above the top wall 162. The bottom wall 160 may be defined by a floor of the cabin 110, or alternatively, the bottom wall may be positioned on the floor of the cabin 110.

The rear wall 166 includes an interior surface 172 and an exterior surface 174 opposite the interior surface 172. The interior surface 172 faces the cavity 150 of the cart compartment 102. The exterior surface 174 may define the rear 126 of the galley 104 and may be exposed to the exterior environment of the galley 104. For example, the rear wall 166 may be exposed to the passenger area 112 of the cabin 110. The rear wall 166 is provided opposite the front wall 164 and the doors 152. Portions or all of the rear wall 166 may be devoid of air ducts or other components of the airflow supply and return system 118. The rear wall 166 is thin, such as a single panel, as opposed to conventional galleys that provide ducts within the thickness of the rear wall, such as in a double-paneled, compartmented wall. Such conventional rear walls are typically approximately 4-5 inches (10-13 cm) wide between the interior surface 172 and the exterior surface 174. However, in the illustrated embodiment, the rear wall 166 is devoid of air ducts and thus has a thickness between the interior and exterior surfaces 172, 174 of approximately 0.5 inch (1-2 cm). By eliminating the ducts in the rear wall 166, the rear wall 166, and thus the overall galley footprint, may be reduced by approximately 3-4 inches (7-10 cm) or more. In the illustrated embodiment, both the supply and return ducts 132, 134 are located at the top wall 162. In the illustrated embodiment, the supply and return ducts 132, 134 are shifted forward of the rear wall 166 and extend directly vertically below the mid-wall 105.

In an exemplary embodiment, the airflow supply and return system 118 includes at least one supply device 176 and at least one return device 178. The supply device 176 is provided along and is in flow communication with the supply duct 132. The return device 178 is provided along and is in flow communication with the return duct 134. In various embodiments, the airflow devices 176 and/or 178 may be air grilles with openings allowing airflow therethrough. The air grill does not necessarily engage the galley carts 108 but rather may be position within the cavity 150 to direct air into, or receive air from, the galley cart 108. The air grilles may be separate components attached to the ducts 132, 134 or alternatively may be defined by openings in the ducts 132, 134 as opposed to being separate components. In other various embodiments, the airflow devices 176 and/or 178 may be cart valves configured to engage and/or mate with the galley cart 108 and seal to corresponding vents or openings of the galley cart 108 to provide a flow of air through the vents/openings of the galley cart 108.

During use, flow of air through the supply and return system 118 flows through the air supply duct 132, through the supply device 176 and into the cavity 150. The air passes over the galley carts 108 by an air-over-cart supply arrangement. The air from the cavity 150 then flows from the galley cart 108 through the return device 178 and into the air return duct 134. Optionally, because the air tends to warm and rise as the heat is transferred from the galley carts 108 to the air to cool the galley carts 108, the supply device 176 tends to be lower than the return device 178. For example, the supply device 176 may be located at or near the bottom wall 160. The return device 178 may be located at or near the top wall 162 (or the mid-wall 105). The supply and return ducts 132, 134 are positioned remote from each other with at least one galley cart 108 positioned therebetween to ensure the air flows around the at least one galley cart 108 as the air flows from the supply duct 132 to the return duct 134. Other arrangements are possible, including having the air supply at or near the top and/or the air return at or near the bottom.

In an exemplary embodiment, both the air supply duct 132 and the air return duct 134 are routed along the rear 126 of the galley 104 to the cart compartment 102. In the illustrated embodiment, the supply duct 132 is approximately centered within the cart compartment 102 between the side walls 168, 170 of the galley 104 and two return ducts 134 are provided at the side walls 168, 170; however, other arrangements are possible in alternative embodiments. For example, the positions of the supply and return ducts 132, 134 may be switched with multiple supply ducts 132 provided at the side walls 168, 170 and a single return duct 134 approximately centered within the cart compartment. In other various embodiments, both the supply and return ducts 132, 134 are provided near the center of the cart compartment 102. Alternatively, no ducts are provided at the center of the cart compartment 102, rather the supply duct 132 is provided at the side wall 168 while the return duct 134 is provided at the side wall 170, or vice versa.

Optionally, the air supply duct 132 and the air return duct 134 are both positioned forward of the rear 126. For example, as in the illustrated embodiment, the air supply duct 132 and the air return duct 134 are positioned forward of the rear 126 for the entire height of the galley 104. The air supply duct 132 and the air return duct 134 are run behind the cabinets (and may occupy at least some of the space used for the cabinets in conventional systems). The air supply duct 132 and the air return duct 134 are routed through the mid-wall 105 into the cart compartment 102. The ducts 132, 134 run along the interior surface of the rear wall 166 within the cavity 150.

However, in various embodiments, portions of the air supply duct 132 and the air return duct 134 may be positioned behind the rear 126. For example, above the mid-wall 105, the air supply duct 132 and the air return duct 134 may be positioned behind the rear 126 and at, just above or just below the mid-wall 105, the air supply duct 132 and the air return duct 134 may transition forward such that the air supply duct 132 and the air return duct 134 are positioned forward of the rear 126, and the rear wall 166, below the mid-wall 105 (e.g., in the cart compartment 102). The air supply duct 132 and the air return duct 134 may be behind the rear 126 above the mid-wall 105 because such positioning does not negatively impact the passenger leg space, which is only impacted at the height generally at or below the mid-wall 105 (e.g., below approximately 3 feet (1 meter)). Such positioning does not encroach upon the passenger when seated in the row of passenger seats 114 immediately behind the galley 104. Routing of the air supply duct 132 and the air return duct 134 behind the rear 126 but above the mid-wall 105 does not negatively impact the cabinet space above the mid-wall 105.

The supply duct 132 includes a front 180 in the cavity 150 facing the doors 152 and a rear 182 opposite the front 180 and facing the rear wall 166. The supply duct 132 includes first and second sides 184, 186 in the cavity 150 extending between the front 180 and the rear 182. In an exemplary embodiment, the sides 184, 186 are exposed in the cavity 150 and face the galley carts 108 on opposite sides of the supply duct 132; however, only one side 184 or 186 may face the galley carts 108 in alternative embodiments, with the other side 184 or 186 facing the side wall 168 or 170, such as when the supply duct 132 is provided at the side of the cart compartment 102 as opposed to in the center of the cart compartment 102.

The supply duct 132 is positioned in the cavity 150 such that the supply duct 132 is positioned forward of the rear wall 166 and the rear 182 of the supply duct 132 faces the rear wall 166. The interior surface 172 of the rear wall 166 is positioned rearward or behind the supply duct 132. The supply duct 132 extends vertically below the mid-wall 105 at least partially between the mid-wall 105 and the bottom wall 160. Positioning the supply duct 132 forward of the rear wall 166 (as opposed to in the rear wall as with conventional systems) allows the supply duct 132 to be positioned in line with the galley carts 108. For example, the supply duct 132 may be positioned between two galley carts 108 and may direct air through the side(s) 184 and/or 186 toward the galley cart 108. The cart compartment 102 houses one or more galley carts 108 between the supply duct 132 and the return duct 134 and the air is able to flow from the supply duct 132 across and around the galley cart(s) 108 to the return duct 134.

Optionally, the supply duct 132 may extend only partially into the cavity 150 (across the depth between the rear wall 166 and the front wall 164). For example, the front 180 may be remote from the rear wall 166 (forward of the rear wall 166) and remote from the front wall 164 (behind the front wall 164). As such, the supply duct 132 occupies cart space in the cart compartment 102. Optionally, the supply duct 132 may extend approximately half way across the depth (e.g., approximately centered between the rear wall 166 and the front wall 164); however, the supply duct 132 may extend any depth between the rear wall 166 and the front wall 164. As such, a first cart space 188 is provided forward of the front 180 to receive a reduced depth galley cart 108', such as a galley cart that is approximately half the depth of a normal galley cart 108. The normal galley carts 108 are located in a second cart space 189, which is a full depth cart space that occupies the full depth of the cavity 150 between the front wall 164 and the rear wall 166. Optionally, at least a portion of the front 180 may be angled such that the front 180 is non-parallel to the rear 182. For example, the supply duct 132 may be deeper at a bottom 190 of the supply duct 132 and shallower at a mid-wall portion 192 of the supply duct 132 (located immediately below the mid-wall 105) and/or a top 194 of the supply duct 132 (located at or near the heat exchanger 116.

In an exemplary embodiment, the supply duct 132 includes a plurality of the supply devices 176 that direct the airflow in multiple directions into the cavity 150. For example, in the illustrated embodiment, supply devices 176 are provided at both sides 184, 186 and at the front 180. The supply devices 176 thus direct airflow to the galley carts 108 located at the first side 184, the galley carts 108 located at the second side 186 and the reduced depth galley cart located forward of the supply duct 132. In an exemplary embodiment, the bottom 190 of the supply duct 132 extends entirely to the bottom wall 160 and one or more of the supply devices 176 are positioned at or near the bottom wall 160. Optionally, one or more supply devices 176 may additionally or alternatively be located remote from the bottom 190, such as approximately midway between the mid-wall portion 192 and the bottom 190.

The return ducts 134 are provided at the side walls 168, 170. The return ducts 134 extend through the mid-wall 105 into the cavity 150 of the cart compartment 102. Portions of the return ducts 134 extend into the cavity 150 below the mid-wall 105. In an exemplary embodiment, the return ducts 134 only extend a short distance into the cavity 150 and the return devices 178 are provided at the mid-wall 105. As such, the warmer air at the top of the cavity 150 is forced into the return devices 178. Optionally, galley carts 108 may fit under the return ducts 134. The return ducts 134 may extend at least part of the depth of the cavity 150 from the rear wall 166 to the front wall 164. Optionally, the return ducts 134 may extend a majority or an entirety of the depth of the cavity 150. In other various embodiments, the return ducts 134 may be provided in the side walls 168, 170 rather than being interior of the side walls 168, 170.

Figure 6:
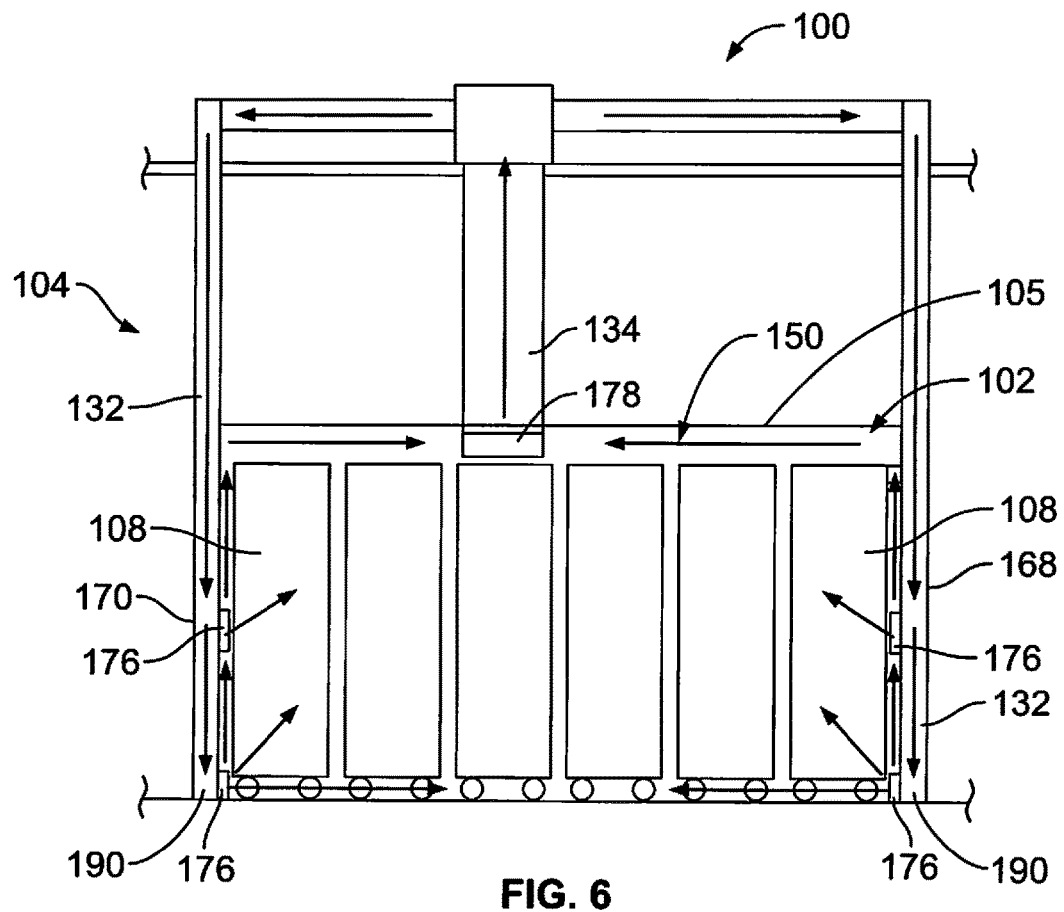
FIG. 6 is a front cross-sectional view across a width of a galley in accordance with an exemplary embodiment showing an air supply and an air return.

FIG. 6 is a front cross-sectional view across a width of the galley 104 in accordance with an exemplary embodiment showing the air supply and the air return in different positions than the embodiment shown in FIG. 2. In the embodiment shown in FIG. 6, the galley system 100 includes two supply ducts 132 at the side walls 168, 170 and a single return duct 134 approximately centered on the galley 104.

The supply ducts 132 extend through the mid-wall 105 into the cavity 150 of the cart compartment 102, such as to the bottom wall 160. The supply devices 176 are provided at or near the bottom 190 to supply the cold air to the lower portions of the cart compartment 102. The galley carts 108 are in line with the supply ducts 132. The supply ducts 132 may extend at least part of the depth of the cavity 150 from the rear wall 166 to the front wall 164. Optionally, the supply ducts 132 may extend a majority or an entirety of the depth of the cavity 150. In other various embodiments, the supply ducts 132 may be provided in the side walls 168, 170 rather than being interior of the side walls 168, 170.

The return duct 134 extends through the mid-wall 105 into the cavity 150 of the cart compartment 102. A portion of the return duct 134 extends into the cavity 150 below the mid-wall 105. In an exemplary embodiment, the return duct 134 only extends a short distance into the cavity 150 and return devices 178 are provided at the mid-wall 105. As such, the warmer air at the top of the cavity 150 is forced into the return devices 178. Optionally, galley carts 108 may fit under the return duct 134.

A galley system is provided for an aircraft that supplies cooling air to a compartment of a galley for cooling galley carts. The supply and/or return ducts and supply and/or return devices are provided in the cart space forward of the rear wall of the cart compartment to reduce a thickness of the rear wall and thus a size or footprint of the galley monument. Additional space is provided in the passenger compartment by eliminating ducts in the rear wall and thus thinning the wall, which allows shifting of the exterior surface of the rear wall of the cart compartment forward reducing the depth of the galley. Additional room for passenger seating or other functions is provided with the reduced depth galley.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley comprising:
a cart compartment configured to receive at least one galley cart having a front, a rear and a side between the front and the rear of the galley cart, the cart compartment being defined by a plurality of walls, the plurality of walls comprising a rear wall behind the cart compartment, side walls along sides of the cart compartment, a mid-wall above the cart compartment and a bottom wall below the cart compartment;
at least one door coupled to the cart compartment to enclose and allow access to the cart compartment; and
a supply duct configured to supply cooled airflow to the cart compartment, the supply duct includes a side extending between a front and a rear, the rear facing the rear wall, the front facing the door, the side being vertically oriented, the side of the supply duct being positioned between the front and the rear of the at least one galley cart in line with and facing the side of the at least one galley cart, the supply duct being positioned in the cart compartment forward of the rear wall and positioned in the cart compartment between the mid-wall and the bottom wall, the supply duct including a supply opening in the side between the front and the rear of the supply duct in-line with the side of the at least one galley cart between the front and the rear of the at least one galley cart to allow airflow from an interior of the supply duct into the cart compartment.

2. The galley of claim 1, wherein the supply duct is positioned in line with the at least one galley cart forward of a rear of the at least one galley cart.

3. The galley of claim 1, wherein the rear wall extends behind the supply duct and the at least one galley cart received in the cart compartment.

4. The galley of claim 1, wherein the rear wall includes an interior surface facing the cart compartment and an exterior surface opposite the interior surface, the supply duct being positioned forward of the interior surface.

5. The galley of claim 1, wherein the rear wall is devoid of ducts.

6. The galley of claim 1, wherein the side has a variable thickness between the front and the rear.

7. The galley of claim 1, wherein the supply duct includes two sides, the supply duct including supply openings at both sides and at the front.

8. The galley of claim 1, wherein the supply duct extends to the bottom wall, the supply opening being positioned at or near the bottom wall.

9. The galley of claim 1, wherein the supply duct occupies cart space in the cart compartment.

10. The galley of claim 1, wherein the supply duct is positioned between at least two galley carts.

11. The galley of claim 1, further comprising a return duct in flow communication with the cart compartment, the return duct being positioned in the cart compartment forward of the rear wall and positioned in the cart compartment between the mid-wall and the bottom wall, the return duct including a return opening to allow airflow from the cart compartment into an interior of the return duct.

12. The galley of claim 11, wherein at least one of the supply duct or the return duct is positioned along one of the side walls forward of the rear wall.

13. The galley of claim 11, wherein the cart compartment houses the at least one galley cart between the supply duct and the return duct.

14. The galley of claim 1, wherein the supply duct extends above the mid-wall to a heat exchanger.

15. The galley of claim 1, wherein the front being positioned approximately half way between the rear wall and the doors.

16. A galley comprising:
a cart compartment including a cavity configured to receive at least one galley cart having a front, a rear and a side between the front and the rear of the galley cart, the cart compartment being defined by a plurality of walls, the plurality of walls comprising a rear wall behind the cart compartment and opposite a front of the cart compartment;
at least one door coupled to the front of the cart compartment to enclose and allow access to the cart compartment; and
a supply duct configured to supply cooled airflow to the cart compartment, the supply duct having a rear facing the rear wall, the supply duct having a front in the cavity and facing the at least one door, the front of the supply duct being located in the cavity of the cart compartment forward of a rear of the at least one galley cart, and the supply duct having a side in the cavity extending between the front and the rear, the side being vertically oriented, the side of the supply duct being in-line with and configured to face the at least one galley cart, the supply duct including a supply opening at the side in line with the at least one galley cart between the front and the rear of the at least one galley cart and allowing airflow from an interior of the supply duct into the cart compartment through the side.

17. The galley of claim 16, wherein the supply duct is positioned in line with the at least one galley cart.

18. The galley of claim 16, wherein the rear wall extends behind the supply duct and the at least one galley cart received in the cart compartment.

19. The galley of claim 16, wherein the rear wall is devoid of ducts.

20. A galley system comprising:
a heat exchanger supplying cooled airflow;
an airflow supply and return system having a supply duct and a return duct in flow communication with the heat exchanger, the supply duct includes a side extending between a front and a rear; and
a galley receiving the supply duct and the return duct and being in flow communication with the heat exchanger, the galley comprising a cart compartment including a cavity configured to receive a first galley cart and a second galley cart having a front, a rear and a side between the front and the rear of the second galley cart, the cavity receiving the supply duct to supply cooled airflow to the cart compartment, the side of the supply duct being vertically oriented in the cart compartment, the supply duct including a supply opening at the side of the supply duct to allow airflow from an interior of the supply duct to the cart compartment, the first galley cart having a reduced depth compared to the second galley cart, the cart compartment being defined by a plurality of walls including a rear wall behind the cavity, the cavity being divided into a first cart space configured to receive the first galley cart and a second cart space configured to receive the second galley cart, the first cart space having a first depth, the second cart space having a second depth, the supply duct being positioned in the cart compartment between the rear wall and the first cart space such that the first depth is less than the second depth, the side of the supply duct being in-line with the second galley cart between the front and the rear of the second galley cart and facing the second galley cart in the second cart space.

21. The galley of claim 1, wherein the supply duct includes one of a supply grill having the supply opening or a supply valve having the supply opening.

* * * * *